United States Patent
Kim et al.

(10) Patent No.: US 11,962,006 B2
(45) Date of Patent: Apr. 16, 2024

(54) CATHODE ACTIVE MATERIAL FOR LITHIUM SECONDARY BATTERY AND LITHIUM SECONDARY BATTERY INCLUDING THE SAME

(71) Applicant: SK INNOVATION CO., LTD., Seoul (KR)

(72) Inventors: Soo Ho Kim, Daejeon (KR); Min Gu Kang, Daejeon (KR); Min Suk Kang, Daejeon (KR)

(73) Assignee: SK ON CO., LTD., Seoul (KR)

( * ) Notice: Subject to any disclaimer, the term of this patent is extended or adjusted under 35 U.S.C. 154(b) by 249 days.

(21) Appl. No.: 17/492,921

(22) Filed: Oct. 4, 2021

(65) Prior Publication Data

US 2022/0109153 A1    Apr. 7, 2022

(30) Foreign Application Priority Data

Oct. 6, 2020 (KR) .................. 10-2020-0128489

(51) Int. Cl.
| | |
|---|---|
| *H01M 4/525* | (2010.01) |
| *C01G 53/00* | (2006.01) |
| *H01M 4/131* | (2010.01) |
| *H01M 4/505* | (2010.01) |
| *H01M 10/0525* | (2010.01) |
| *H01M 4/02* | (2006.01) |

(52) U.S. Cl.
CPC ............ *H01M 4/525* (2013.01); *C01G 53/50* (2013.01); *H01M 4/131* (2013.01); *H01M 4/505* (2013.01); *H01M 10/0525* (2013.01); *C01P 2002/74* (2013.01); *H01M 2004/021* (2013.01)

(58) Field of Classification Search
None
See application file for complete search history.

(56) References Cited

U.S. PATENT DOCUMENTS

| | | | | |
|---|---|---|---|---|
| 5,720,932 A | * | 2/1998 | Amine | H01M 4/525 423/594.4 |
| 2011/0143205 A1 | * | 6/2011 | Makimura | H01M 4/131 429/223 |
| 2015/0380737 A1 | * | 12/2015 | Kawasato | H01M 4/505 252/521.2 |

FOREIGN PATENT DOCUMENTS

| | | |
|---|---|---|
| JP | 4482987 B2 | 6/2010 |
| JP | 2017-226576 A | 12/2017 |
| KR | 10-0821523 B1 | 4/2008 |
| WO | 2017/061633 A1 | 4/2017 |

* cited by examiner

*Primary Examiner* — Carlos Barcena
(74) *Attorney, Agent, or Firm* — IP&T GROUP LLP

(57) ABSTRACT

A cathode active material for a lithium secondary battery according to an embodiment of the present invention includes a lithium composite oxide particle that contains lithium and transition metals including an excess amount of nickel. The lithium composite oxide particle satisfies a predetermined XRD peak area relation. A lithium secondary battery using the cathode active material and providing improved stability and durability is provided.

13 Claims, 1 Drawing Sheet

CATHODE ACTIVE MATERIAL FOR LITHIUM SECONDARY BATTERY AND LITHIUM SECONDARY BATTERY INCLUDING THE SAME

CROSS-REFERENCE TO RELATED APPLICATION AND CLAIM OF PRIORITY

This application claims priority to Korean Patent Application No. 10-2020-0128489 filed on Oct. 6, 2020 in the Korean Intellectual Property Office (KIPO), the entire disclosure of which is incorporated by reference herein.

BACKGROUND

1. Field

The present invention relates to a cathode active material for a lithium secondary battery and a lithium secondary battery including the same. More particularly, the present invention relates to a cathode active material including a pl metal elements for a lithium secondary battery and a lithium secondary battery including the same.

2. Description of the Related Art

A secondary battery which can be charged and discharged repeatedly has been widely employed as a power source of a mobile electronic device such as a camcorder, a mobile phone, a laptop computer, etc., according to developments of information and display technologies. The secondary battery includes, e.g., a lithium secondary battery, a nickel-cadmium battery, a nickel-hydrogen battery, etc. The lithium secondary battery is highlighted due to high operational voltage and energy density per unit weight, a high charging rate, a compact dimension, etc.

For example, the lithium secondary battery may include an electrode assembly including a cathode, an anode and a separation layer (separator), and an electrolyte immersing the electrode assembly. The lithium secondary battery may further include an outer case having, e.g., a pouch shape.

A lithium metal oxide may be used as an active material for a cathode of the lithium secondary battery. For example, the lithium metal oxide may include a nickel-based lithium metal oxide. A nickel-containing precursor compound may be used to prepare the nickel-based lithium metal oxide.

Recently, as an application range of the lithium secondary battery has been expanded from a small electronic device to a large scaled device such as a hybrid vehicle, a content of nickel is increasing to achieve sufficient capacity and power. However, as the content of nickel increases, reliability of the cathode active material may be deteriorated due to mismatch and side reaction with lithium.

For example, Korean Registered Patent Publication No. 10-0821523 discloses a method for manufacturing a cathode active material using a lithium composite metal oxide, but still possess the problem of a high nickel-based cathode active material.

SUMMARY

According to an aspect of the present invention, there is provided a cathode active material having improved stability and reliability.

According to an aspect of the present invention, there is provided a lithium secondary battery having improved stability and reliability.

According to exemplary embodiments, a cathode active material for a lithium secondary battery comprises a lithium composite oxide particle that contains lithium and transition metals including an excess amount of nickel. The lithium composite oxide particle satisfies Equation 1.

$$1.0 \leq A(003)/A(104) \leq 1.5 \quad \text{[Equation 1]}$$

In Equation 1, A(003) is an area of a peak corresponding to a (003) plane in an X-ray diffraction (XRD) analysis graph, and A(104) is an area of a peak corresponding to a (104) plane in the XRD analysis graph.

In some embodiments, the lithium composite oxide particle may have a single particle shape.

In some embodiments, the lithium composite oxide particle having the single particle shape may have a particle diameter from 3 μm to 12 μm.

In some embodiments, a spacing between (003) planes of the lithium composite oxide particle may be from 100 nm to 210 nm.

In some embodiments, a full width at half maximum (FWHM) corresponding to the (003) plane in the XRD analysis graph of the lithium composite oxide particle may be from 0.066° to 0.072°.

In some embodiments, a full width at half maximum (FWHM) corresponding to the (104) plane in the XRD analysis graph of the lithium composite oxide particle may be from 0.08° to 0.108°.

In some embodiments, A(003)/A(104) of the lithium composite oxide particle may be from 1.1 to 1.4.

In some embodiments, the lithium composite oxide particle may satisfy Equation 2.

$$7.0 \leq A(104)/A(105) \quad \text{[Equation 2]}$$

In Equation 2, A(104) is the area of the peak corresponding to the (104) plane in the XRD analysis graph, and A(105) is an area of a peak corresponding to a (105) plane in the XRD analysis graph.

In some embodiments, A(104)/A(105) of the lithium composite oxide particle may be from 7.0 to 8.5.

In some embodiments, a reduction ratio of a specific surface area of the lithium composite oxide particle by a pressure from 2.5 ton to 3.5 ton may be from 10% to 30%.

In some embodiments, a molar ratio of nickel in the transition metals contained in the lithium composite oxide particle may be 0.5 or more.

In some embodiments, the transition metals of the lithium composite oxide particle further include cobalt and manganese.

In some embodiments, the lithium composite oxide particle may be represented by Chemical Formula 1.

$$Li_xNi_aM_{1-a}O_y \quad \text{[Chemical Formula 1]}$$

In Chemical Formula 1, M is at least one of Al, Zr, Ti, Cr, B, Mg, Co, Mn, Ba, Si, Y, W and Sr, $0.9 \leq x \leq 1.2$, $1.9 \leq y \leq 2.1$ and $0.5 \leq a \leq 1$.

According to exemplary embodiments, a lithium secondary battery includes a cathode including the cathode active material for a lithium secondary battery according embodiments as described above; and an anode facing the cathode.

In some embodiments, a reversible capacity may increase by 2% to 10% as a charging voltage increase by 0.1V based on 4.3V.

According to exemplary embodiments, a cathode active material may include a lithium composite oxide in which an excess amount of nickel among transition metals is included and a peak area ratio of a (003) plane and a (104) plane in an XRD analysis graph is within in a predetermined range.

Accordingly, stability of a crystal structure of the cathode active material may be improved, and durability and stability of the battery at high temperature/voltage may be improved. Further, an amount of gas generation may be reduced, and penetration stability and cycle property of the battery may be improved.

DETAILED DESCRIPTION OF THE EMBODIMENTS

Figure 1:
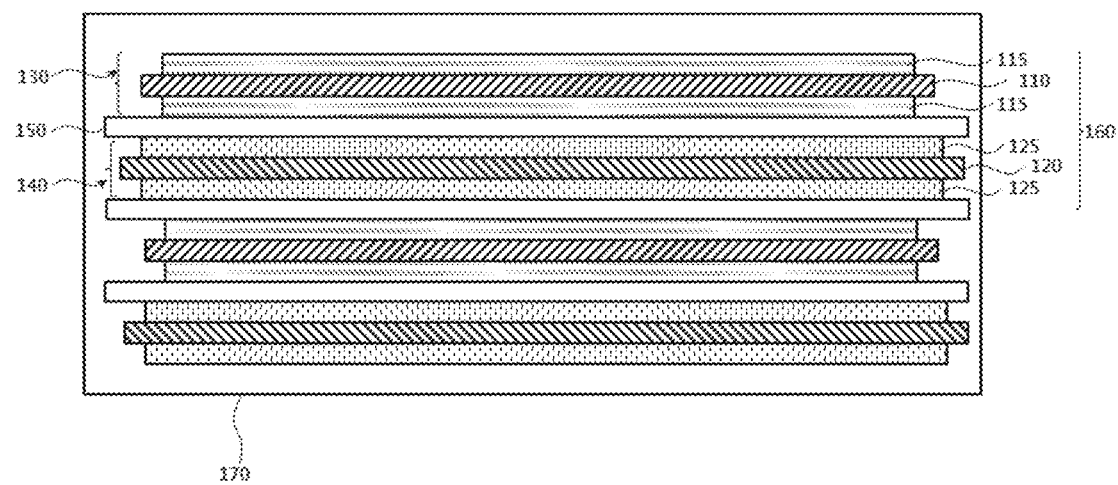
FIG. 1 is a schematic cross-sectional view illustrating a lithium secondary battery in accordance with exemplary embodiments exemplary embodiments.

According to exemplary embodiments of the present invention, there is provided a cathode active material that includes a lithium composite oxide containing lithium and transition metals and having a predetermined range of an XRD peak ratio.

Hereinafter, the present invention will be described in detail with reference to the accompanying drawings. However, those skilled in the art will appreciate that such embodiments described with reference to the accompanying drawings are provided to further understand the spirit of the present invention and do not limit subject matters to be protected as disclosed in the detailed description and appended claims.

A cathode active material for a lithium secondary battery (hereinafter, may be abbreviated as a cathode active material) may include lithium composite oxide particles containing lithium and a transition metal including an excess amount of nickel.

As used herein, the term 'excess amount' may refer to the largest mole fraction or molar ratio.

The lithium composite oxide particle may have the largest molar fraction of nickel among transition metals.

The lithium composite oxide particle may include nickel. Nickel may be included in the excess amount among elements except for lithium and oxygen in the lithium composite oxide particle.

Nickel (Ni) may serve as a metal associated with a capacity of a lithium secondary battery. In exemplary embodiments, nickel may be included in the excess amount of elements except for lithium and oxygen to remarkably improve the capacity of the secondary battery.

In exemplary embodiments, the molar ratio of nickel in the transition metal contained in the lithium composite oxide particle may be 0.5 or more. The molar ratio of nickel among elements except for lithium and oxygen of the lithium composite oxide particles may be 0.5 or more.

Preferably, the molar ratio of nickel may be 0.6 or more, 0.7 or more, 0.8 or more. Preferably, the molar ratio of nickel may be from 0.6 to 0.95, from 0.7 to 0.95 or from 0.8 to 0.95.

In some embodiments, the lithium composite oxide particle may be a nickel-cobalt-based lithium composite oxide further containing cobalt. In some embodiments, the lithium composite oxide particle may be a nickel-cobalt-manganese (NCM)-based lithium composite oxide further including cobalt and manganese.

In exemplary embodiments, the lithium composite oxide particles may be represented by Chemical Formula 1 below.

 [Formula 1]

In Chemical Formula 1, M may be at least one of Al, Zr, Ti, Cr, B, Mg, Co, Mn, Ba, Si, Y, W and Sr, and $0.9 \leq x \leq 1.2$, $1.9 \leq y \leq 2.1$, $0.5 \leq a \leq 1$.

For example, as the content of nickel increases, the capacity and power of the lithium secondary battery may be improved. For example, nickel and manganese (Mn) may be distributed together throughout the particle, so that chemical and mechanical stability of the lithium secondary battery may be further improved.

Manganese (Mn) may serve as a metal related to mechanical and electrical stability of the lithium secondary battery. For example, manganese may suppress or reduce defects such as ignition and short circuit that may occur when a cathode is penetrated by an external object, and may increase a life-span of the lithium secondary electricity. Cobalt (Co) may be a metal associated with a conductivity or a resistance of the lithium secondary battery.

Figure 2:
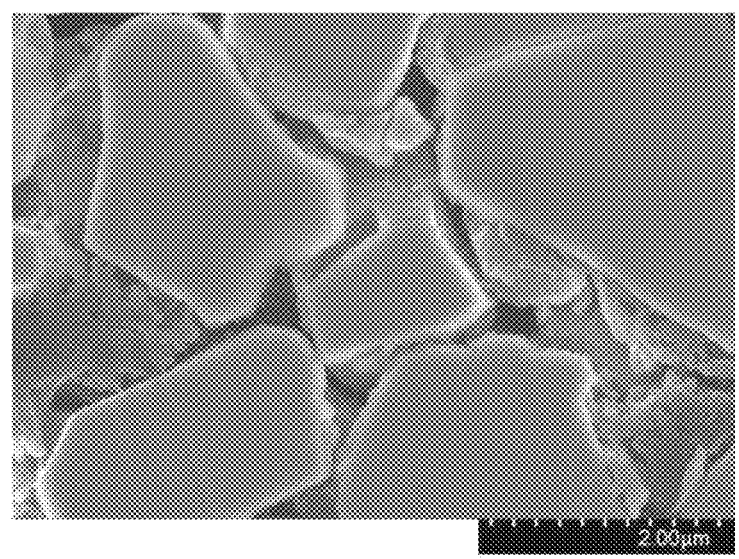
FIG. 2 is an SEM (Scanning Electron Microscopy) image of a cathode active material for a lithium secondary battery in accordance with exemplary embodiments.

FIG. 2 is a scanning electron microscopy (SEM) image of a cathode active material for a lithium secondary battery according to exemplary embodiments.

In exemplary embodiments, the lithium composite oxide particle may have a single particle shape as shown in FIG. 2. For example, the lithium composite oxide particle may not have a secondary particle shape formed by an aggregation of a plurality of primary particles (e.g., 10 or more primary particles) into a substantially single unitary particle. For example, the single particle structure or the single particle shape may include a single crystal structure (e.g., a crystal of the compound of Formula 1).

The single particle does not exclude a form in which, for example, less than 10 particles are adjacent to each other and attached to each other.

In exemplary embodiments, a particle diameter (e.g., D50 from a volume cumulative distribution) of the lithium composite oxide particle may be from 3 μm to 12 μm. If the particle diameter of the lithium composite oxide particle is less than 3 μm, a stability of a particle surface structure may be reduced under high temperature or high voltage conditions, and a reactivity with the electrolyte may increase. If the particle diameter of the lithium composite oxide particles is greater than 12 μm, a density of the active material layer formed of the cathode active material may be decreased, and a diffusivity of lithium ions may be decreased.

The lithium composite oxide particle satisfy according to exemplary embodiments satisfies Equation 1 below.

$$1.0 \leq A(003)/A(104) \leq 1.5 \quad \text{[Equation 1]}$$

In Equation 1, A(003) is an area of a peak corresponding to a (003) plane in an X-ray diffraction (XRD) analysis graph, and A(104) is an area of a peak corresponding to a (104) plane in the X-ray diffraction (XRD) analysis graph.

In exemplary embodiments, the XRD analysis may be performed in a diffraction angle (2θ) range of 10° to 120° and at a scan rate of 0.01°/step using a Cu-Kα ray as a light source for a powder sample of the cathode active material for the lithium secondary battery.

The lithium composite oxide particle satisfying Equation 1 may have enhanced crystallinity. In this case, physical and chemical stability of a crystal structure may be improved. Thus, improved power and capacity of the battery may be stably maintained for a long period even during repeated charging and discharging operations.

Further, decomposition of the lithium composite oxide particles may be prevented under the high temperature and high voltage conditions, and the reaction with the electrolyte may be suppressed. Therefore, high voltage durability and high temperature storage property may be achieved.

For example, when the content of Ni in the lithium composite oxide particle is increased, a cation disorder may occur due to an interchange of Ni and lithium (Li), and Li ion sites may be occupied by Ni ions. In this case, the crystallinity of the cathode active material may be decreased. When a temperature of a sintering process is increased to increase the crystallinity, a desired crystal structure may not be formed due to a topotactic transition of lithium ions.

However, according to exemplary embodiments, the lithium composite oxide particle containing the excess amount of Ni and satisfying Equation 1, the crystallinity may be improved. Accordingly, the secondary battery having improved power, capacity and long-term stability may be achieved.

For example, the range represent by Equation 1 may be adjusted by changing a type and a ratio of reactants (a composite metal precursor and a lithium source) in a manufacturing process of the cathode active material, or a type of gas used in the sintering process, a reaction time, a reaction temperature, etc.

Preferably, A(003)/A(104) of the lithium composite oxide particle is from 1.1 to 1.4 or from 1.2 to 1.3.

In exemplary embodiments, the lithium composite oxide particle may have a spacing between the (003) planes from 100 nm to 210 nm.

In exemplary embodiments, a full width at half maximum (FWHM) corresponding to the (003) plane in the XRD analysis graph of the lithium composite oxide particle ay be from 0.066° to 0.072°.

In exemplary embodiments, an FWHM corresponding to the (104) plane in the XRD analysis graph of the lithium composite oxide particle ay be from 0.08° to 0.108°.

Unlike the A(003)/A(104) value, the half-width value of each peak may be inversely proportional to a crystallite size, and when a lithium composite oxide having the single particle structure is included, the half-width value may become smaller as will be confirmed in Examples and Comparative Examples to be described later.

In the above-described half-width range, the lithium composite oxide particle may have more improved crystallinity.

In exemplary embodiments, the lithium composite oxide particle may satisfy Equation 2 below.

$$7.0 \leq A(104)/A(105)$$ [Equation 2]

In Equation 2, A(104) is an area of a peak corresponding to a (104) plane in the XRD analysis graph, and A(105) is an area of a peak corresponding to a (105) plane in the XRD analysis graph.

Preferably, A(104)/A(105) may be less than or equal to 8.5.

The lithium composite oxide particle satisfying Equation 2 may have enhanced crystallinity. In this case, physical and chemical stability of a crystal structure may be improved. Thus, improved power and capacity of the battery may be stably maintained for a long period even during repeated charging and discharging operations.

Further, decomposition of the lithium composite oxide particles may be prevented under the high temperature and high voltage conditions, and the reaction with the electrolyte may be suppressed. Therefore, high voltage durability and high temperature storage property may be achieved.

In exemplary embodiments, a strength of the lithium composite oxide particle may be 500 MPa or more. If the strength is less than 500 MPa, the lithium composite oxide particle may be damaged during a high pressure rolling for forming the active material layer.

In exemplary embodiments, the lithium composite oxide particle may have a lithium-ion diffusivity of $10^{-8}$ to $10^{-7}$ S/cm under a 3.7V to 4.3V charge/discharge condition.

In exemplary embodiments, a specific surface area reduction ratio of the lithium composite oxide particle under a pressure from 2.5 ton to 3.5 ton may be from 10% to 30%. For example, even when the lithium composite oxide particles are rolled under the high pressure to form the active material layer having a density of 3.5 g/cm$^3$ or more, a stable structure and a lithium delivery ability may be maintained.

In some embodiments, the lithium composite oxide particles may further include a coating element or a doping element. For example, the coating element or the doping element may include Al, Ti, Ba, Zr, Si, B, Mg, P, Sr, W, La, an alloy thereof, or an oxide thereof. These may be used alone or in combination therefrom. The cathode active material particle may be passivated by the coating or doping element, so that the stability relative to the external penetration and the life-span may be further improved.

For example, the lithium composite oxide particle may be formed by a reaction between a composite metal precursor and a lithium source.

The composite metal precursor may be prepared through a co-precipitation reaction of metal salts. The metal salts may include a nickel salt, a manganese salt and a cobalt salt.

Examples of the nickel salt include nickel sulfate, nickel hydroxide, nickel nitrate, nickel acetate, a hydrate thereof, etc. Examples of the manganese salt include manganese sulfate, manganese acetate, a hydrate thereof, etc. Examples of the cobalt salt include cobalt sulfate, cobalt nitrate, cobalt carbonate, a hydrates thereof, etc.

The metal salts may be mixed with a precipitating agent and/or a chelating agent at a ratio satisfying the content or concentration ratio of each metal described with reference to Chemical Formula 1 to form an aqueous solution. The aqueous solution may be co-precipitated in a reactor to prepare the composite metal precursor.

The precipitating agent may include an alkaline compound such as sodium hydroxide (NaOH), sodium carbonate (Na$_2$CO$_3$), or the like. The chelating agent may include, e.g., aqueous ammonia (e.g., NH$_3$H$_2$O), ammonium carbonate (e.g., NH$_3$HCO$_3$), or the like.

A temperature of the co-precipitation reaction may be controlled, e.g., in a range from about 40° C. to 60° C. A reaction time may be adjusted in a range from about 24 hours to 72 hours.

The lithium composite oxide particle (the cathode active material) may be prepared by mixing and reacting the composite metal precursor and the lithium source. The lithium source may include, e.g., lithium carbonate, lithium nitrate, lithium acetate, lithium oxide, lithium hydroxide, etc. These may be used alone or in combination therefrom.

Thereafter, lithium impurities or unreacted precursors may be removed through, e.g., a washing process, and metal particles may be fixed and crystallinity may be increased through a heat treatment (an annealing or a sintering) process.

In one embodiment, the heat treatment temperature may be in a range from about 600° C. to 1000° C.

According to exemplary embodiments of the present invention, a lithium secondary battery including the above-described cathode active material is provided.

FIG. 1 is a schematic cross-sectional view illustrating a lithium secondary battery in accordance with exemplary embodiments exemplary embodiments.

Referring to FIG. 1, the lithium secondary battery may include a cathode 130, an anode 140 and a separation layer 150 interposed between the cathode and the anode.

The cathode 130 may include a cathode current collector 110 and a cathode active material layer 115 formed by coating a cathode active material on the cathode current collector 110.

A cathode slurry may be prepared by mixing and stirring the cathode active material in a solvent with a binder, a conductive material and/or a dispersive agent. The cathode slurry may be coated on the cathode current collector 110, and then dried and pressed to form the cathode 130.

The cathode current collector 110 may include stainless-steel, nickel, aluminum, titanium, copper or an alloy thereof. Preferably, aluminum or an alloy thereof may be used.

The binder may include an organic based binder such as a polyvinylidene fluoride-hexafluoropropylene copolymer (PVDF-co-HFP), polyvinylidenefluoride (PVDF), polyacrylonitrile, polymethylmethacrylate, etc., or an aqueous based binder such as styrene-butadiene rubber (SBR) that may be used with a thickener such as carboxymethyl cellulose (CMC).

For example, a PVDF-based binder may be used as a cathode binder. In this case, an amount of the binder for forming the cathode active material layer may be reduced, and an amount of the cathode active material may be relatively increased. Thus, capacity and power of the lithium secondary battery may be further improved.

The conductive material may be added to facilitate electron mobility between active material particles. For example, the conductive material may include a carbon-based material such as graphite, carbon black, graphene, carbon nanotube, etc., and/or a metal-based material such as tin, tin oxide, titanium oxide, a perovskite material such as $LaSrCoO_3$ or $LaSrMnO_3$, etc.

In exemplary embodiments, the anode 140 may include an anode current collector 120 and an anode active material layer 125 formed by coating an anode active material on the anode current collector 120.

The anode active material may include a material commonly used in the related art which may be capable of adsorbing and ejecting lithium ions. For example, a carbon-based material such as a crystalline carbon, an amorphous carbon, a carbon complex or a carbon fiber, a lithium alloy, silicon (Si)-based compound, tin, etc., may be used.

The amorphous carbon may include a hard carbon, cokes, a mesocarbon microbead (MCMB) fired at a temperature of 1500° C. or less, a mesophase pitch-based carbon fiber (MPCF), etc. The crystalline carbon may include a graphite-based material such as natural graphite, graphitized cokes, graphitized MCMB, graphitized MPCF, etc. The lithium alloy may further include aluminum, zinc, bismuth, cadmium, antimony, silicon, lead, tin, gallium, indium, etc.

The anode current collector 120 may include, e.g., gold, stainless steel, nickel, aluminum, titanium, copper or an alloy thereof, preferably may include copper or a copper alloy.

In some embodiments, a slurry may be prepared by mixing and stirring the anode active material with a binder, a conductive material and/or a dispersive agent in a solvent. The slurry may be coated on the anode current collector 120, and then dried and pressed to form the anode 140.

The binder and the conductive agent substantially the same as or similar to those mentioned above may also be used in the anode. In some embodiments, the binder for forming the anode may include, e.g., an aqueous binder such as styrene-butadiene rubber (SBR) for compatibility with the carbon-based active material, and may be used together with a thickener such as carboxymethyl cellulose (CMC).

The separation layer 150 may be interposed between the cathode 130 and the anode 140. The separation layer 150 may include a porous polymer film prepared from, e.g., a polyolefin-based polymer such as an ethylene homopolymer, a propylene homopolymer, an ethylene/butene copolymer, an ethylene/hexene copolymer, an ethylene/methacrylate copolymer, or the like. The separation layer 150 may also include a non-woven fabric formed from a glass fiber with a high melting point, a polyethylene terephthalate fiber, or the like.

In some embodiments, an area and/or a volume of the anode 140 (e.g., a contact area with the separation layer 150) may be greater than that of the cathode 130. Thus, lithium ions generated from the cathode 130 may be easily transferred to the anode 140 without a loss by, e.g., precipitation or sedimentation. Thus, improvement of power and stability may be efficiently realized through the combination with the above-described cathode active material.

In exemplary embodiments, an electrode cell 160 may be defined by the cathode 130, the anode 140 and the separation layer 150, and a plurality of the electrode cells 160 may be stacked to form an electrode assembly that may have e.g., a jelly roll shape. For example, the electrode assembly may be formed by winding, laminating or folding the separation layer 150.

The electrode assembly may be accommodated together with an electrolyte in an outer case 170 to define a lithium secondary battery. In exemplary embodiments, a non-aqueous electrolyte may be used as the electrolyte.

For example, the non-aqueous electrolyte solution may include a lithium salt and an organic solvent. The lithium salt commonly used in the electrolyte for the lithium secondary battery may be used, and may be represented by $Li^+X^-$.

An anion of the lithium salt $X^-$ may include, e.g., $F^-$, $Cl^-$, $Br^-$, $I^-$, $NO_3^-$, $N(CN)_2^-$, $BF_4^-$, $ClO_4^-$, $PF_6^-$, $(CF_3)_2PF_4^-$, $(CF_3)_3PF_3^-$, $(CF_3)_4PF_2^-$, $(CF_3)_5PF^-$, $(CF_3)_6P^-$, $CF_3SO_3^-$, $CF_3CF_2SO_3^-$, $(CF_3SO_2)_2N^-$, $(FSO_2)_2N^-$, $CF_3CF_2(CF_3)_2CO^-$, $(CF_3SO_2)_2CH^-$, $(SF_5)_3C^-$, $(CF_3SO_2)_3C^-$, $CF_3(CF_2)_7SO_3^-$, $CF_3CO_2^-$, $CH_3CO_2^-$, $SCN^-$, $(CF_3CF_2SO_2)_2N^-$, etc.

The organic solvent may include, e.g., propylene carbonate (PC), ethylene carbonate (EC), diethyl carbonate (DEC), dimethyl carbonate (DMC), ethylmethyl carbonate (EMC), methylpropyl carbonate, dipropyl carbonate, dimethyl sulfoxide, acetonitrile, dimethoxy ethane, diethoxy ethane, vinylene carbonate, sulfolane, gamma-butyrolactone, propylene sulfite, tetrahydrofuran, etc. These may be used alone or in a combination thereof.

Electrode tabs may protrude from the cathode current collector 110 and the anode electrode current collector 120 included in each electrode cell to one side of the outer case 170. The electrode tabs may be welded together with the one side of the outer case 170 to form an electrode lead extending or exposed to an outside of the outer case 170.

The lithium secondary battery may be manufactured in, e.g., a cylindrical shape using a can, a square shape, a pouch shape or a coin shape.

In the lithium secondary battery according to exemplary embodiments, as a charging voltage increases by 0.1V based on 4.3V, a reversible capacity may increase by 2% to 10%.

Hereinafter, preferred embodiments are proposed to more concretely describe the present invention. However, the following examples are only given for illustrating the present invention and those skilled in the related art will obviously understand that various alterations and modifications are possible within the scope and spirit of the present invention. Such alterations and modifications are duly included in the appended claims.

Example 1

A lithium composite oxide particle having a single particle shape and having a composition of $LiNi_{0.5}Co_{0.2}Mn_{0.3}O_2$ with a particle size $D_{50}$ of 5.5 μm from a particle size distribution analysis was prepared as a cathode active material, Specifically, $NiSO_4$, $CoSO_4$ and $MnSO_4$ were mixed in a ratio of 0.5:0.2:0.3, respectively, using distilled water from which dissolved oxygen was removed by $N_2$ gas bubbling. The prepared solution was put into a reactor at 45° C., and NaOH and $NH_3$ $H_2O$ were used as a precipitating agent and a chelating agent to proceed with a co-precipitation reaction for 12 hours to obtain $Ni_{0.5}Co_{0.2}Mn_{0.3}(OH)_2$ as a transition metal precursor. The obtained precursor slurry was filtered and dried at 110° C. for 12 hours.

Lithium hydroxide and the transition metal precursor were added in a ratio of 1.05:1 in a dry high-speed mixer and uniformly mixed for 5 minutes. The mixture was placed in a kiln and heated to 1,100° C. at a temperature increasing rate of 2° C./min, and maintained at 1,100° C. for 10 hours. After the sintering, natural cooling was performed to room temperature, followed by pulverization and classification to form the lithium-transition metal composite oxide particle having the single particle shape and having the composition of $LiNi_{0.5}Co_{0.2}Mn_{0.3}O_2$ composition (including single-crystal and polycrystalline structures).

A cathode slurry was prepared by using Denka Black as a conductive material and PVDF as a binder, and mixing the cathode active material: the conductive material: the binder in a mass ratio of 92:5:3. The cathode slurry was coated on an aluminum substrate, dried and pressed to form a cathode having density of 3.6 g/cc or higher.

93 wt % of an anode active material including natural graphite and artificial graphite in a 50:50 weight ratio, 5 wt % of a flake type KS6 conductive material, 1 wt % of a styrene-butadiene rubber (SBR) binder and 1 wt % of carboxymethyl cellulose (CMC) as a thickener were mixed to from an anode slurry. The anode slurry was coated on a copper substrate, dried and pressed to prepare an anode.

The cathode and the anode obtained as described above were notched with a proper size and stacked, and a separator (polyethylene, thickness: 25 μm) was interposed between the cathode and the anode to form an electrode cell. Each tab portion of the cathode and the anode was welded. The welded cathode/separator/anode assembly was inserted in a pouch, and three sides of the pouch except for an electrolyte injection side were sealed. The tab portions were also included in sealed portions. A non-aqueous electrolyte solution was injected through the electrolyte injection side, and then the electrolyte injection side was also sealed. Subsequently, the above structure was impregnated for more than 12 hours.

After preparing 1.0 M $LiPF_6$ solution in a mixed solvent of EC/EMC/DEC (25/45/30; volume ratio), 1 wt % of vinylene carbonate (VC), 0.5 wt % of 1,3-propensultone (PRS) and 0.5 wt % of lithium bis(oxalato)borate (LiBOB) were added to from the electrolyte solution.

A pre-charging was performed for 36 minutes with a current (5 A) corresponding to 0.25 C. After 1 hour, degassing and aging for more than 24 hours were performed, and then a formation charge and discharge was performed (charge condition: CC-CV 0.2 C 4.25V 0.05 C CUT-OFF, discharge condition: CC 0.2 C 2.5V CUT-OFF).

Thereafter, a standard charging and discharging was performed (charging condition: CC-CV 0.5 C 4.25V 0.05 C CUT-OFF, discharging condition: CC 0.5 C 2.5V CUT-OFF).

Example 2

A lithium secondary battery was manufactured by the same method as that in Example 1, except that a lithium composite oxide having a composition of $LiNi_{0.65}Co_{0.15}Mn_{0.2}O_2$ was used.

Example 3

A lithium secondary battery was manufactured by the same method as that in Example 1, except that a lithium composite oxide having a composition of $LiNi_{0.7}Co_{0.15}Mn_{0.15}O_2$ was used.

Example 4

A lithium secondary battery was manufactured by the same method as that in Example 1, except that a lithium composite oxide having a composition of $LiNi_{0.75}Co_{0.10}Mn_{0.15}O_2$ was used.

Example 5

A lithium secondary battery was manufactured by the same method as that in Example 1, except that a lithium composite oxide having a composition of $LiNi_{0.8}Co_{0.1}Mn_{0.1}O_2$ was used.

Comparative Example 1

A lithium secondary battery was manufactured by the same method as that in Example 1, except that a lithium composite oxide having a composition of $LiNi_{0.5}Co_{0.2}Mn_{0.3}O_2$ and having a secondary particle structure in which primary particles of small particle diameters were aggregated was used.

Comparative Example 2

A lithium secondary battery was manufactured by the same method as that in Comparative Example 1, except that a lithium composite oxide having a composition of $LiNi_{0.65}Co_{0.15}Mn_{0.2}O_2$ was used.

Comparative Example 3

A lithium secondary battery was manufactured by the same method as that in Comparative Example 1, except that a lithium composite oxide having a composition of $LiNi_{0.8}Co_{0.1}Mn_{0.1}O_2$ was used.

Experimental Example (1) XRD Analysis

The lithium composite oxides of Examples and Comparative Examples were analyzed by an XRD (Cu-Kα ray, 2θ: 10° to 120°, scan rate: 0.01°/step).

In an analysis spectrum, a ratio of an area A(003) of a peak from a (003) plane relative to an area A(104) of a peak from a (104) plane was calculated and shown in Table 1 below.

A ratio of an area A(104) of a peak from the (104) plane relative to an area A(105) of a peak from a (105) plane was calculated and shown in Table 1 below.

Each peak area was calculated as an integral value of each peak.

Additionally, half widths of the peaks of the (104) plane and the (003) plane were measured and shown in Table 1 below. A unit of the half width is degree)(°, which represents of 2θ.

(2) Evaluation on Life-Span at Room Temperature

Charging (CC-CV 1.0 C 4.25V 0.05 C CUT-OFF) and discharging (CC 1.0 C 2.7V CUT-OFF) were repeated 500 times for the lithium secondary batteries of Examples. For the secondary batteries of Comparative Examples, charging (CC-CV 1.0 C 4.2V 0.05 C CUT-OFF) and discharging (CC 1.0 C 2.7V CUT-OFF) were repeated 500 times.

A ratio of the discharge capacity at 500th cycle relative to the discharge capacity at the first cycle was calculated as a percentage (%) to evaluate a room temperature life-span, and the results are shown in Table 1 below.

(3) Penetration Stability Evaluation

After charging the lithium secondary battery of Examples (1 C 4.25V 0.1 C CUT-OFF) and charging the lithium secondary battery of Comparative Examples (1 C 4.2V 0.1 C CUT-OFF), the batteries were penetrated by a nail of 3 mm in diameter with 80 mm/sec to evaluate whether ignition or explosion occurred by the following standard. The results are shown in Table 1 below.

<Evaluation Standard, EUCAR Hazard Level>

L1: No malfunction of battery performance
L2: Irreversible damage to battery performance
L3: A weight of the battery electrolyte was reduced by less than 50%
L4: A weight of the battery electrolyte was reduced by 50% or more.
L5: Ignition or explosion occurred.

TABLE 1

| | Lithium Composite Oxide Particle | | | | | Capacity | |
| --- | --- | --- | --- | --- | --- | --- | --- |
| | Molar ratio of Ni (%) | Half width (003) | Half width (104) | A(003)/ A(104) | A(104)/ A(105) | Charge Voltage (V) | Retention at room temperature (%; @500 cycles) | Penetration Stability |
| Example 1 | 50 | 0.0670 | 0.1077 | 1.24 | 7.23 | 4.25 | 98 | L3 |
| Example 2 | 65 | 0.0687 | 0.1036 | 1.25 | 7.29 | 4.25 | 93 | L3 |
| Example 3 | 70 | 0.0668 | 0.0857 | 1.28 | 7.21 | 4.25 | 91 | L3 |
| Example 4 | 75 | 0.0686 | 0.0808 | 1.22 | 7.25 | 4.25 | 90 | L3 |
| Example 5 | 80 | 0.0712 | 0.102 | 1.30 | 7.05 | 4.25 | 82 | L3 |
| Comparative Example 1 | 50 | 0.0709 | 0.0994 | 1.55 | 6.89 | 4.20 | 95 | L3 |
| Comparative Example 2 | 65 | 0.0734 | 0.1045 | 1.54 | 6.72 | 4.20 | 88 | L3 |
| Comparative Example 3 | 80 | 0.0917 | 0.1767 | 1.61 | 6.58 | 4.20 | 65 | L5 |

Referring to Table 1, the cathode active materials and the lithium secondary batteries of Examples provided improved life-span and penetration stability compared to those from Comparative Examples including the same content of Ni.

(4) Evaluation of Gas Generation

After charging the lithium secondary battery of Examples to 100% SoC (State of Charge) (4.25V 0.05 C Cut-off), and after charging the lithium secondary battery of Comparative Examples to 100% SoC (4.20V 0.05 C Cut-off), the batteries were stored at in a 60° C. chamber.

The lithium secondary battery was taken out from the storage chamber at each storage period (1 week, 2 weeks, 4 weeks and 8 weeks), and an amount of gas was analyzed using a gas chromatography. The results are shown in Table 2 below.

TABLE 2

| | Molar ratio of Ni (%) | Charge Voltage (V) | Gas generation amount (mL) | | | |
| --- | --- | --- | --- | --- | --- | --- |
| | | | 1 week | 2 weeks | 4 weeks | 8 weeks |
| Example 1 | 50 | 4.25 | 3.1 | 3.9 | 5.2 | 7.1 |
| Example 2 | 65 | 4.25 | 6.0 | 6.8 | 8.4 | 10.8 |
| Example 3 | 70 | 4.25 | 8.2 | 9.0 | 10.7 | 14.4 |
| Example 4 | 75 | 4.25 | 11.7 | 12 | 13.7 | 19.6 |
| Example 5 | 80 | 4.25 | 12.8 | 13.6 | 16.7 | 20.5 |
| Comparative Example 1 | 50 | 4.20 | 8.5 | 9.8 | 12.1 | 15.4 |
| Comparative Example 2 | 65 | 4.20 | 13.2 | 14.3 | 17.2 | 20.3 |
| Comparative Example 3 | 80 | 4.20 | 18.0 | 19.8 | 23.4 | 35.2 |

Referring to Table 2, the gas generation at high temperature storage was remarkably suppressed in the cathode active materials and the lithium secondary batteries of Examples provided compared to those from Comparative Examples.

What is claimed is:

1. A cathode active material for a lithium secondary battery comprising a lithium composite oxide particle that contains lithium and transition metals including nickel,
   wherein a molar ratio of nickel in the transition metals contained in the lithium composite oxide particle is 0.5 or more,
   wherein the lithium composite oxide particle satisfies Equation 1 and Equation 2:

$$1.0 \leq A(003)/A(104) \leq 1.5 \quad \text{[Equation 1]}$$

wherein, in Equation 1, A(003) is an area of a peak corresponding to a (003) plane in an X-ray diffraction (XRD) analysis graph, and A(104) is an area of a peak corresponding to a (104) plane in the XRD analysis graph, $$7.0 \leq A(104)/A(105) \quad \text{[Equation 2]}$$

wherein, in Equation 2, A(104) is the area of the peak corresponding to the (104) plane in the XRD analysis graph, and A(105) is an area of a peak corresponding to a (105) plane in the XRD analysis graph.

2. The cathode active material for a lithium secondary battery of claim 1, wherein the lithium composite oxide particle has a single particle shape.

3. The cathode active material for a lithium secondary battery of claim 2, wherein the lithium composite oxide particle having the single particle shape has a particle diameter from 3 μm to 12 μm.

4. The cathode active material for a lithium secondary battery of claim 1, wherein a spacing between (003) planes of the lithium composite oxide particle is from 100 nm to 210 nm.

5. The cathode active material for a lithium secondary battery of claim 1, wherein a full width at half maximum (FWHM) corresponding to the (003) plane in the XRD analysis graph of the lithium composite oxide particle is from 0.066° to 0.072°.

6. The cathode active material for a lithium secondary battery of claim 1, wherein a full width at half maximum (FWHM) corresponding to the (104) plane in the XRD analysis graph of the lithium composite oxide particle is from of 0.08° to 0.108°.

7. The cathode active material for a lithium secondary battery of claim 1, wherein A(003)/A(104) of the lithium composite oxide particle is from 1.1 to 1.4.

8. The cathode active material for a lithium secondary battery of claim 1, wherein A(104)/A(105) of the lithium composite oxide particle is from 7.0 to 8.5.

9. The cathode active material for a lithium secondary battery of claim 1, wherein a reduction ratio of a specific surface area of the lithium composite oxide particle by a pressure from 2.5 tons to 3.5 tons is from 10% to 30%.

10. The cathode active material for a lithium secondary battery of claim 1, wherein the transition metals of the lithium composite oxide particle further include cobalt and manganese.

11. The cathode active material for a lithium secondary battery of claim 1, wherein the lithium composite oxide particle are represented by Chemical Formula 1:

$$Li_xNi_aM_{1-a}O_y \qquad \text{[Chemical Formula 1]}$$

wherein, in Chemical Formula 1, M is at least one of Al, Zr, Ti, Cr, B, Mg, Co, Mn, Ba, Si, Y, W and Sr, 0.9≤x≤1.2, 1.9≤y≤2.1 and 0.5≤a≤1.

12. A lithium secondary battery, comprising:
a cathode comprising the cathode active material for a lithium secondary battery of claim 1; and an anode facing the cathode.

13. The lithium secondary battery of claim 12, wherein a reversible capacity increases by 2% to 10% as a charging voltage increases by 0.1V based on 4.3V.

* * * * *